(12) United States Patent  
Siltala et al.

(10) Patent No.: US 10,132,051 B2  
(45) Date of Patent: Nov. 20, 2018

(54) HYBRID ENERGY PLANT

(71) Applicant: SUBSEA-ENERGY OY, Oulu (FI)

(72) Inventors: Timo Siltala, Jyvaskyla (FI); Aki Kauhanen, Oulu (FI)

(73) Assignee: SUBSEA-ENERGY OY, Oulu (FI)

( * ) Notice: Subject to any disclaimer, the term of this patent is extended or adjusted under 35 U.S.C. 154(b) by 70 days.

(21) Appl. No.: 14/785,441

(22) PCT Filed: Apr. 22, 2014

(86) PCT No.: PCT/FI2014/050289  
§ 371 (c)(1),  
(2) Date: Oct. 19, 2015

(87) PCT Pub. No.: WO2014/170557  
PCT Pub. Date: Oct. 23, 2014

(65) Prior Publication Data  
US 2016/0083920 A1    Mar. 24, 2016

(30) Foreign Application Priority Data

Apr. 19, 2013 (FI) ..................... 20135402

(51) Int. Cl.  
F03B 17/02 (2006.01)  
F03B 13/18 (2006.01)  
(Continued)

(52) U.S. Cl.  
CPC ............... E02B 9/08 (2013.01); F03B 13/16 (2013.01); F03B 13/1815 (2013.01);  
(Continued)

(58) Field of Classification Search  
CPC .......... F03B 12/12; F03B 13/12; F03B 13/14; F03B 13/16; F03B 13/18; F03B 13/20;  
(Continued)

(56) References Cited

U.S. PATENT DOCUMENTS 3,746,875 A    7/1973  Donatelli  
6,731,018 B1 *  5/2004  Grinsted ................. F03B 17/06  
290/42

(Continued)

FOREIGN PATENT DOCUMENTS

GB         2 230 300 A     10/1990  
KR     20100114875 A     10/2010  
(Continued)

OTHER PUBLICATIONS

International Search Report, dated Jun. 10, 2014, from corresponding PCT application.

(Continued)

*Primary Examiner* — Mark Laurenzi  
*Assistant Examiner* — Deming Wan  
(74) *Attorney, Agent, or Firm* — Young & Thompson (57) ABSTRACT

The invention pertains to energy production by capturing simultaneously water potential (surface height differences due to waves) and kinetic (flow of water due to e.g. waves, tide or streams) energy. The plant can have tidal compensation (2, 3, 22, 23) to avoid energy flux streaming over the plant in high tide, and directional stabilizing arrangement to turn it automatically parallel to wave crests. Surfaces capturing energy from flow have optimized movements to follow speed of water in different depths. Also energy conservation to filter output ripple can be arranged with twin-phase fluid accumulators (51, 55).

28 Claims, 9 Drawing Sheets

(51) Int. Cl.
*F03B 13/20* (2006.01)
*F03B 13/10* (2006.01)
*F03B 13/12* (2006.01)
*H02P 9/04* (2006.01)
*E02B 9/08* (2006.01)
*F03B 13/16* (2006.01)

(52) U.S. Cl.
CPC ..... *F05B 2240/912* (2013.01); *F05B 2240/95* (2013.01); *F05B 2260/406* (2013.01); *Y02E 10/28* (2013.01); *Y02E 10/38* (2013.01)

(58) Field of Classification Search
CPC .......... F03B 13/22; F03B 17/02; Y02E 10/20; Y02E 10/38; H02P 9/04
USPC ................... 290/53, 42, 43, 54; 60/495–500
See application file for complete search history.

(56) References Cited

U.S. PATENT DOCUMENTS

| | | | |
|---|---|---|---|
| 6,768,216 B1 | 7/2004 | Carroll et al. | |
| 8,253,263 B2* | 8/2012 | Atilano | F03B 13/186 290/42 |
| 2006/0080957 A1* | 4/2006 | Fernandez Gomez | F03B 13/1855 60/495 |
| 2008/0122225 A1 | 5/2008 | Smith | |
| 2009/0015013 A1* | 1/2009 | Jaer | F03B 13/16 290/53 |
| 2009/0121487 A1 | 5/2009 | Fraenkel | |
| 2009/0243293 A1 | 10/2009 | Farb | |
| 2010/0058754 A1 | 3/2010 | Fong et al. | |
| 2010/0064678 A1* | 3/2010 | Cucurella Ripoli | F03B 13/1815 60/501 |
| 2010/0132353 A1 | 6/2010 | Kelly | |
| 2010/0164227 A1* | 7/2010 | Grassi | F03B 13/20 290/52 |
| 2010/0327583 A1* | 12/2010 | Hunt | B63B 21/50 290/43 |
| 2011/0278848 A1* | 11/2011 | Gimsa | F03B 13/1855 290/53 |
| 2012/0001431 A1 | 1/2012 | Smith | |

FOREIGN PATENT DOCUMENTS

| | | |
|---|---|---|
| KR | 101007633 B1 | 1/2011 |
| WO | 2006/010783 A1 | 2/2006 |
| WO | 2013/107934 A1 | 7/2013 |

OTHER PUBLICATIONS

FI Search Report, dated Feb. 3, 2014, from corresponding FI application.
Supplementary European Search Report EP14785684 dated Oct. 12, 2016.

* cited by examiner

HYBRID ENERGY PLANT

FIELD OF INVENTION

This invention pertains to energy production by capturing simultaneously water potential energy and water kinetic energy. The potential energy relates to surface height differences due to waves, and kinetic energy relates to flow of water due to e.g. waves, tide or streams.

BACKGROUND TECHNOLOGY

Energy in ocean waves exists in two forms: potential energy generating water surface height differences which we see as waves and kinetic energy which moves the water particles back and forth. The energy is split equally between these two forms. More detailed description can be found from Dominic Reeve, Andrew Chadwick and Chris Fleming's book "Coastal Engineering, Processes, Theory and Design Practice", second edition, 2012, Spoon Press, London and New York, ISBN 978-0-415-58352-7.

Prior art technology includes capturing energy from wave potential energy with different floating objects like buoys. Prior art technology also includes capturing energy from water kinetic energy with various stagnation pressure flap constructions. Prior art technology does not capture both energy types simultaneously in an efficient manner.

Most energy plants are not optimized for capturing energy of both types simultaneously. Since half of wave energy exists in potential form and other half in kinematic form, a lot of energy flux is bypassing current power plants. This makes them inefficient and increases unit cost of produced energy. Also movements opposite to water flow in some areas of the moving objects cause very high internal loads to the structures and unnecessary reaction forces to the supporting structures, requiring uneconomical over-sizing of the structures.

Patent document U.S. Pat. No. 8,253,263B2 discloses an energy plant, which captures both energy types. However, certain problems are related to this prior art structure. The structure includes flaps that are fixed with parallel arms, causing the flaps to have permanently fixed orientation. Not following the velocity profile of water in different depths causes excessive forces to the structures when flap motion reaches either end position and stops. Another problem relates to a rigid float of the structure. Wave crests have arbitrary lengths, and a rigid float causes extreme loads to the proposed support tower when one end is on the wave crest and the other on through.

The prior art solution disclosed in U.S. Pat. No. 8,253, 263B2 also relies on extreme conditions survival turning the plant along the wave advancing direction. This orientation is known to produce extreme high loads to a floating object, known in shipbuilding as sagging and hogging, depending on the wave crest and through positions along the floating object, and also pitching movement which causes extreme loads to supports limiting the movement. Incorrectly dimensioned ships without any penetrations break in these circumstances and a ship size object forced to follow a stationary column penetrating through it has severe structural problems on the penetration area and in the column.

There is a further problem which relates to prior art energy plants which are anchored permanently to the sea bed. Tidal changes in water depth reduce radically the energy output of any flap construction in such energy plants because wave flow speed is highest on the surface, going deeper the friction reduce flow speed. Permanent bottom anchoring of a solid flap or wing does not allow the plant to reach the best surface energy flux in high tide. Any fixed anchoring also introduces another power reduction factor, being the angle of incidence between wave crests and plant orientation in waves coming in from arbitrary directions.

Current technology level of wave power plants is still in the testing phase of innovations, and therefore routine maintenance and plant life time economics has not been an important driver. This shows up in the complication of required maintenance: dry docking, diving, towing on shore etc. has to be performed within narrow, calm enough weather windows. Underwater maintenance is impossible in harsh weather due to rapid flows and violent plant movements. The productivity of an energy plant is thus reduced further even due to minor technical problems.

A further problem with prior art wave energy plants relates to currently used gas-pressurized accumulators. The storage capacity available for filtering power ripple is inadequate, causing the output power to alter according to the waves. This makes the wave power difficult to utilize in common grid without additional arrangements.

As a consequence, the prior art wave energy plants do not have optimal efficiency, they are easily damaged in the harsh weather, and they are difficult to maintain.

SUMMARY OF THE INVENTION

The object of the invention is to provide new solutions for providing an energy plant, with which the problems of the prior art energy plants can be avoided or reduced.

The object of the invention is specifically to provide a plant with better than prior art efficiency by capturing simultaneously energy from both potential and kinetic sources of the waves and possible currents in a more effective manner. Kinetic energy capture is optimized by moving surfaces having velocity profiles matching to the flow speed of water particles in different distances from water surface. The plant may also provide means to follow tidal surface level changes thus keeping the flow capturing devices in the highest flow speed zone having highest energy density. Further the plant can be self orienting against incoming waves' direction. The plant may have a capability to limit excessive waves' loads in survival condition.

A hybrid energy plant according to the invention for capturing energy from waves, is characterized in that it has a support structure and one or more wave floats, wherein at least one of the floats is arranged to capture wave potential energy, and wings or flaps attached to at least one of the floats arranged to capture simultaneously wave kinetic energy, wherein the wave float(s) and wings/flaps have a connection to the support structure which connection allows the vertical position and/or orientation of float(s) and/or wings/flaps to accommodate to changes in water surface height and wave direction.

Some preferable embodiments of the invention are described in dependent claims.

According to one embodiment of the invention the energy plant consists of one or more floating objects and different combinations of wings and/or flaps. Potential energy is captured with the floating object(s) buoyancy and mass forces running energy capturing devices, and kinetic energy is captured with wings or flaps running also energy capture devices, either separate or common. The wings' angle of attack and flaps' movement are adjusted to match water speed profile in different depths. The technology of applying and controlling wings in a wave power plant is described in more detail in non-public patent application PCT/FI2013/050046 of the same applicant, included herein as reference.

According to another embodiment the floating object is split to two or more parts. One or more of the floating parts have small enough waterline area not to follow rapid surface changes of waves but keeping constant surface level during tidal water surface level variations. Some floating parts provide counter mass to the movement, and one or more floating parts provide additional buoyancy for protection against extreme waves. The remaining floating parts follow the waves capturing potential energy.

According to a further embodiment the wave follower floating objects are attached to the slowly moving floating objects with hinged or sliding mechanisms.

According to a further embodiment the wave floats can have individual vertical and rolling movements to prevent excessive loads on the foundation and support mechanisms.

According to a further embodiment the wings or flaps are attached to the floating objects following the wave surface changes. The floating object and wing or flap supports can be shaped to enhance the flow.

According to a further embodiment the wings or flaps are also attached to the slowly moving floating object following the tidal surface level changes.

According to a further embodiment the floating objects are arranged in balanced orientation causing the plant to turn automatically parallel to wave crests.

According to a further embodiment the wings angle of incidence are adjustable.

According to a further embodiment the wings are arranged to counter oriented adjacent rows balancing each other's reaction lift forces.

According to a further embodiment the wings are collected to a single or multiple arrays or groups of arrays having common or individual energy capturing devices.

According to a further embodiment the wings or flaps are attached to the system with either bar mechanisms, rollers tracks, hinges, sliders or a combination of these, providing optimum movement in different depths related to the water flow thus preventing internal forces on them caused by unmatched flow and movement speeds.

According to a further embodiment the wings or flaps movement in different depths is adjusted to optimize energy capture within varying wave conditions.

According to a further embodiment the plant is supported to the bottom with either a pile/column, arms or gravitational weight. A pile can be either a dedicated structure for the plant only or a existing support structure for another purpose like wind energy plant. The support structure preferably allows the wave floats and wings/flaps to turn according to the waves' incoming direction. The support structure may also comprise anchoring.

According to a further embodiment the plant has a floating and anchored foundation with submerged structures shaped to maximize added water mass for counter action. The floating foundation may have separate water tanks and an arrangement for pumping water/air between the tanks. This way it is possible to compensate the tendency of the support structure to decline due to external forces.

According to a further embodiment the plant is fixed to sea bed with hinged arm mechanism allowing it to follow tidal surface height and to turn according to the waves' incoming direction.

According to a further embodiment the plant has floats with limited buoyancy to prevent overloading in exceptional high waves.

According to a further embodiment the wings has adjustable angle of attack to prevent overloads in extreme conditions.

According to a further embodiment the flaps has mechanism or hinges to allow them to turn along the flow in extreme conditions. It is also possible to have flaps equipped with lids that open in an over-pressure condition.

According to a further embodiment power take off is arranged with hydraulic cylinders or pumps connected to the wings, wing panels or flaps and hinge.

According to a further embodiment the plant has hydraulic transmission using twin-phase pressure accumulators with or without intermediate fluid.

According to a further embodiment the plant has stepped or stepless adjustment cam and rod mechanism to change the transmission ratio between the wings or flaps and cylinders or pumps.

According to a further embodiment the plant with wings have angle of attack adjustment in continuously flowing water to make the wings to move back and forth continuously.

According to a further embodiment the energy is conserved in twin-phase accumulators, where the pressurizing fluid is partly gas, partly liquid boiling to gas when the pressurizing volume expands, thus keeping the pressure constant independent of hydraulic fluid level. Typical pressurizing fluid is carbon dioxide. The arrangement can use third intermediate fluid to prevent known corrosion problems under certain conditions and to increase the working pressure of hydraulic system.

LIST OF DRAWINGS

In the following the invention is described with help of the enclosed drawings, in which.

DETAILED DESCRIPTION OF EXEMPLARY EMBODIMENTS

The presented figures are not to scale, and component dimensions naturally vary according to requirements in different applications.

Figure 1:
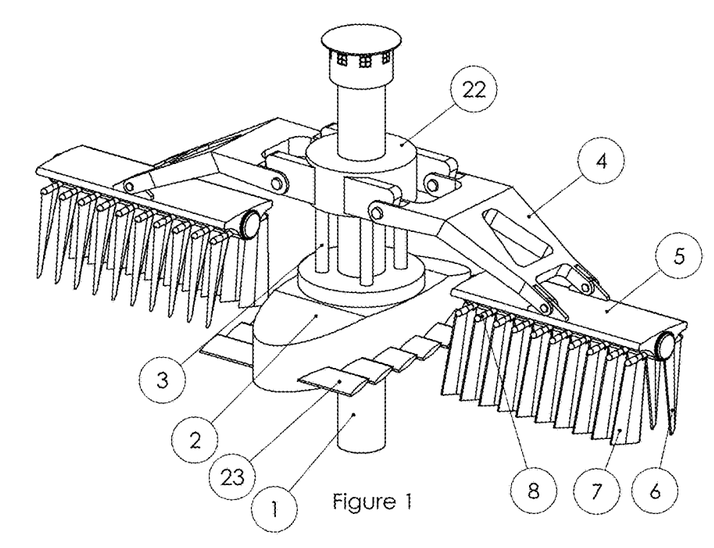
FIG. 1 illustrates an exemplary power plant according to the invention with separate tidal adjustment float and wave follower floats with array of hub wings.

FIG. 1 illustrates an exemplary embodiment of a energy plant according to the invention. The plant captures potential energy from waves with wave floats 5, which follow the water surface height changes caused by waves. Connected to the floats, the plant has wing arrays 6 and 7 for capturing kinetic energy from waves, tidal or other streams or from combination of them.

The plant has a supporting column 1 around which the tidal compensation float slides and rotates. The tidal compensation float consists of partly or totally submerged part 2, connecting part 3, and upper part 22. The connecting part 3 has small waterline area to minimize buoyancy changes due to waves thus keeping the compensation float on steady height. Arms 4 hold the floats 5 and wing arrays 6 and 7. Wings are connected to the floats with wing hubs 8. The supporting column can be either a dedicated pile or have other functions like wind turbine tower.

Tidal compensation float has also a protection function against too high waves. When a wave crest reaches the upper part of compensation float, it will generate additional buoyancy to the float thus raising the entire float system to prevent the wave floats 5 to turn the arms 4 into unwanted position and flowing water to hit the arms. Tidal compensation float can have shape to enhance flow field by forcing flow to the wings or flaps thus adding their flow speed, increasing their power and reducing unwanted drag forces to the support column. Shaping the float to produce additional lift forces upwards and downwards, depending on the direction of water flow, increases the power capture of plant with counter movement to the wave floats. Compensation float can also have active heave stabilizer tanks or protruding profiles 23 with possible active control.

Each of the wave floats 5, two in this example, on the opposite sides of the support structure can move independently to conform to uneven wave crests around the plant. The wave floats can also roll sideways in case of an incoming wave having unequal crest height on their length.

The arms 4 can also be used as lifting devices for maintenance purposes of the wave floats. For the same purpose, the tidal compensation float can also be pumped empty or filled to go deeper, depending on the tide height and local water depth.

Wing arrays 6 and 7 have opposite moving directions so that they balance the hydrodynamic lifting forces of each others. In the example there are two arrays, mounted to the wave floats. The number of adjacent wing arrays can vary according to the expected wave conditions on installation site. In some applications the wings or flaps can be mounted on their own arms, independently of wave floats.

The wing for wave plant may have twist, and profile can change along the wings to keep optimum angle of attack with varying flow speed in different depths. The entire wing can also have adjustable angle of attack to adapt to varying flow speeds in different wave conditions.

The wing may preferably has a form where water flow causes forces according to reaction principle, as known from e.g. reaction turbines. Such a wing has a profile in which a flowing water causes reaction forces that are larger than action forces, which are known from e.g. impulse turbines. More particularly, wing profiles of the plant preferably have such forms and are in such positions that the force component caused by the water flow on the wing profile is smaller in the direction of the of the water flow than the force component in the direction which is orthogonal to the direction of the water flow. In other words, lift force caused by the water flow is higher than force caused by stagnating pressure. The form and position of the wing is preferably optimized so that the lift force provides maximum energy from the water flow with minimum drag. In another embodiment of the invention the surface angle of attack of the wing is adjustable by turning it around support axis. The profile form of the underwater wing may be symmetric or asymmetric. The asymmetric wing profile has two leading edges mirrored as this structure is preferably used in wave energy plants where the flow has reciprocating direction. A symmetric wing profile is preferably used in tide or river streams where the flow direction is constant for a long time and the reciprocal movement of the wing is achieved by adjusting the angle of attack by turning the wings around their support axis, for example.

Figure 15:
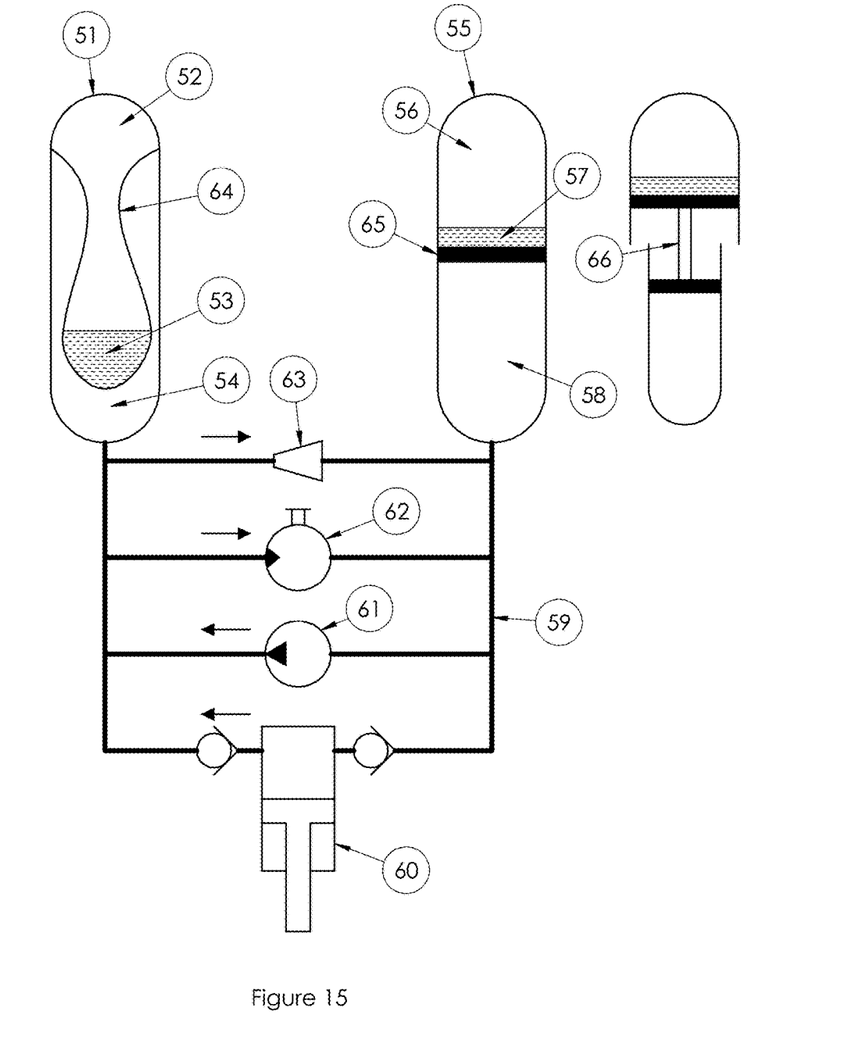
FIG. 15 illustrates an exemplary hydraulic pressure accumulator which can be used in implementing the power plant.

Wave float power is taken off with e.g. hydraulic cylinders, pumps or rotators (not shown in figure) located at the joint between the arms and tidal float. Wing arrays have hydraulic power take offs of their own with cam and rod mechanism and ratio adjustment, for example (not shown in figure). An example of a suitable hydraulic pressure accumulator system is illustrated in FIG. 15.

Figure 2:
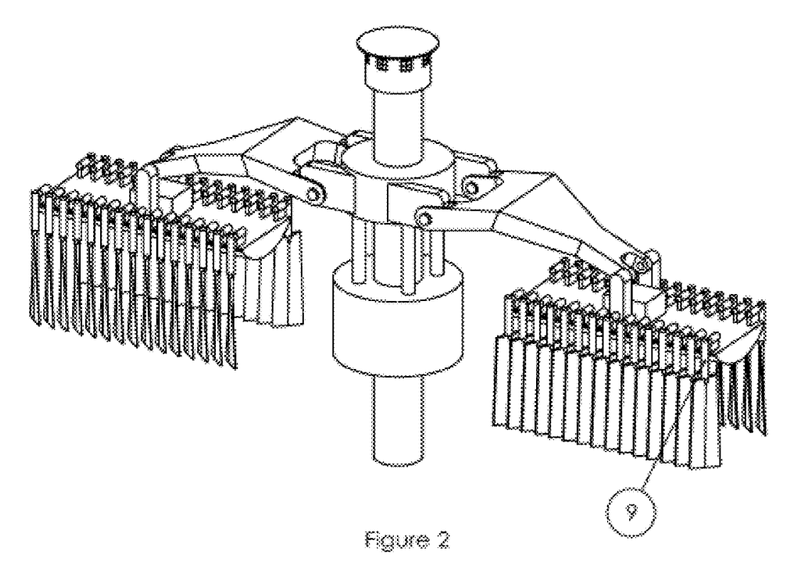
FIG. 2 illustrates an exemplary power plant according to the invention with separate tidal adjustment float and wave follower floats with array of hinged wings.

FIG. 2 illustrates an exemplary embodiment of energy plant according to the invention. The plant has wings with extended support arms 9 to eliminate the low performance wing hubs. All other aspects can be as in the embodiment of FIG. 1.

Figure 3:
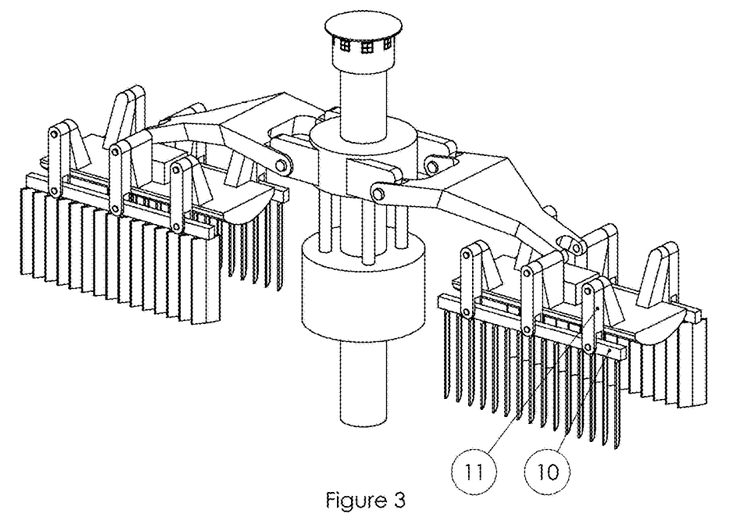
FIG. 3 illustrates an exemplary power plant according to the invention with separate tidal adjustment float and wave follower floats with wing array mechanism.

FIG. 3 illustrates an exemplary embodiment of energy plant according to the invention. The wings are collected to an array 10 moving with a mechanism 11. All other aspects can be as in FIG. 1. with this embodiment it is possible to achieve an even supply of energy from the whole area of a wing. The profile of the wing may be constant along the wing in this embodiment. The array of the wings can also have a different orientation than the vertical orientation shown in the figure. The wing orientation may be horizontal, for example, whereby the wing array moves in vertical direction.

Figure 4:
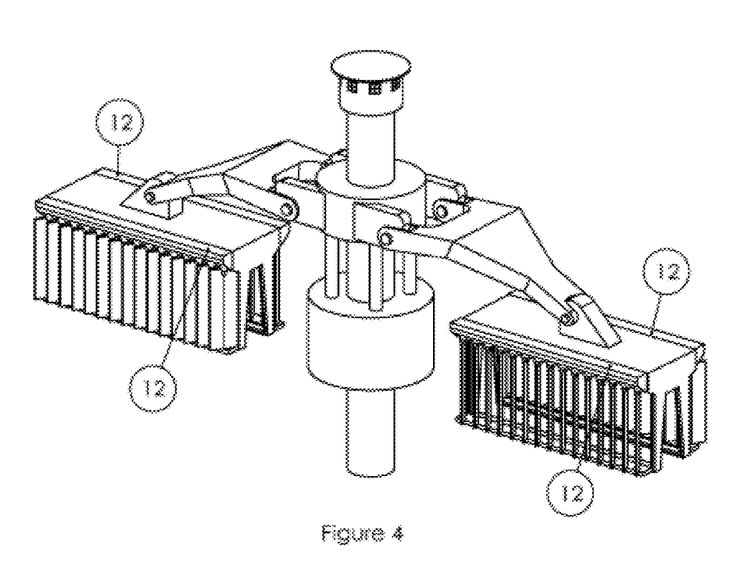
FIG. 4 illustrates an exemplary power plant according to the invention with a separate tidal adjustment float and wave follower floats with sliding array of wings.

FIG. 4 illustrates an exemplary embodiment of energy plant according to the invention. The wings are collected to an array moving with a slide 12. All other aspects can be as in FIG. 3.

Figure 5:
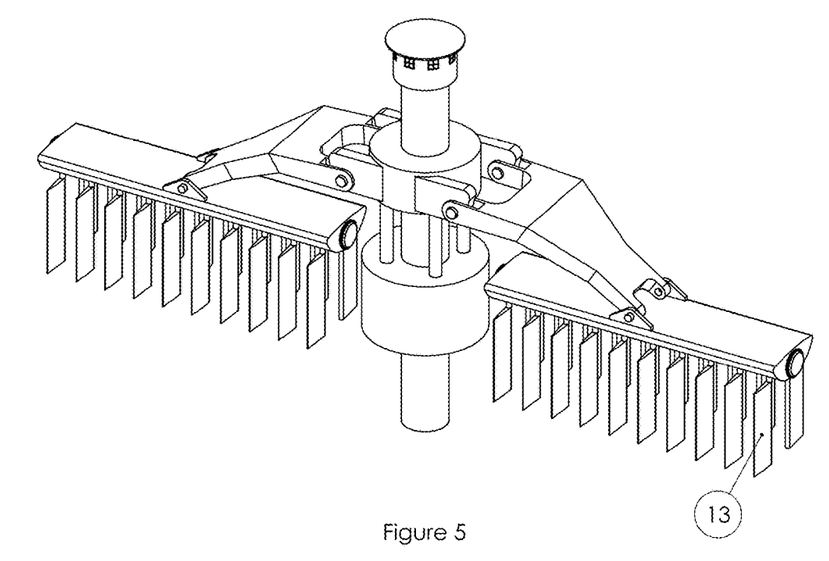
FIG. 5 illustrates an exemplary power plant according to the invention with separate tidal adjustment float and wave follower floats with vertically hinged flaps on survival position.

FIG. 5 illustrates an exemplary embodiment of energy plant according to the invention. The stagnation pressure flaps 13 are hinged vertically to the floats. Flaps can have opposite rotation directions to balance forces caused to supporting structures. All other aspects can be as in FIG. 1.

Figure 6:
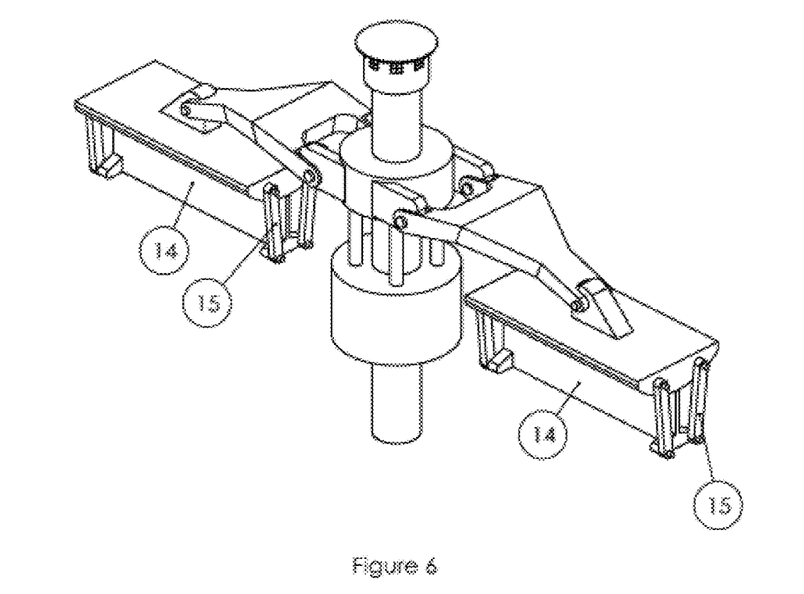
FIG. 6 illustrates an exemplary power plant according to the invention with separate tidal adjustment float and wave follower floats with flaps following the flow speed distribution of water.

FIG. 6 illustrates an exemplary embodiment of energy plant according to the invention. The flaps 14 are supported to the floats with a mechanism 15 causing them to follow water velocity profile in different depths. The flaps can also be supported with roller or sliding mechanism causing similar movement related to depth.

Figure 7:
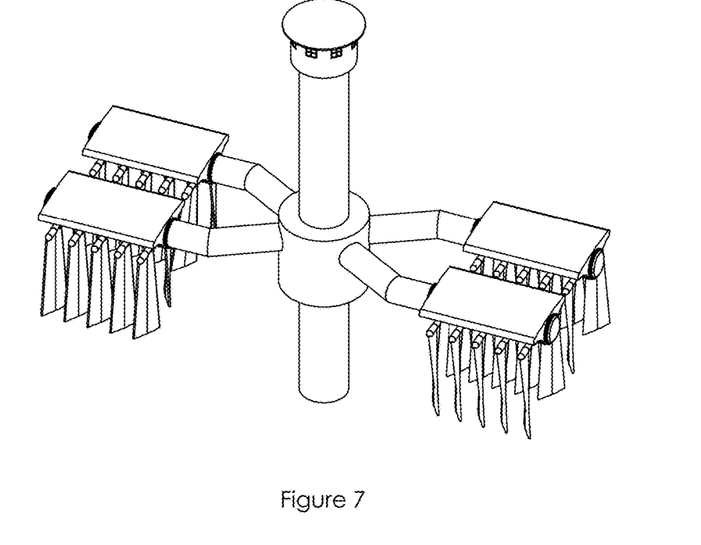
FIG. 7 illustrates an exemplary power plant without separate tidal adjustment float and with double arrays of hub wings on both sides of the column.

FIG. 7 illustrates an exemplary embodiment of energy plant according to the invention, without tidal compensation float. This embodiment has four wave floats, which are fixed to each other, and the combined float structure moves vertically in relation to the column. The potential energy of the waves is thus collected with suitable means from this relative movement.

Figure 8:
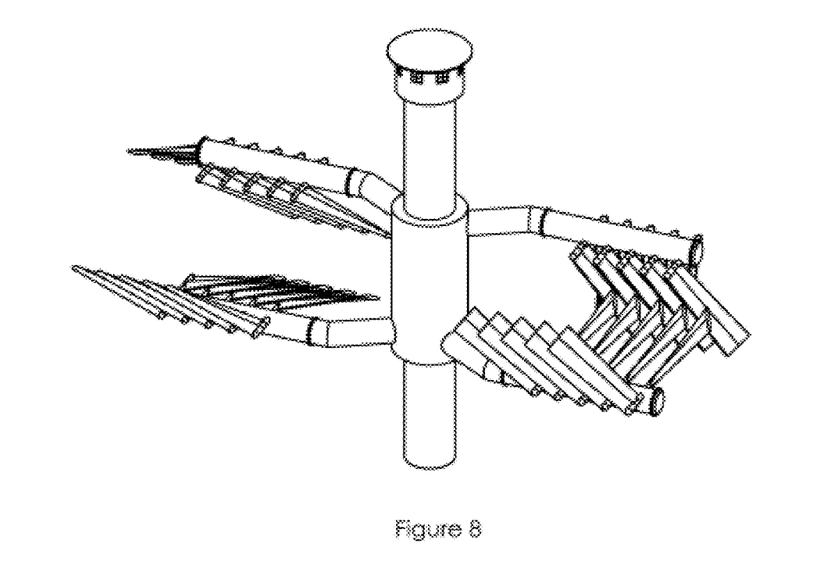
FIG. 8 illustrates an exemplary power plant with integrated tidal adjustment float and double arrays of hub wings with opposite depth position.

FIG. 8 illustrates an exemplary embodiment of energy plant according to the invention with tidal compensation float but without wave floats. The wings can be either pointing upwards, downwards or both. The example shows both alternatives.

Figure 9:
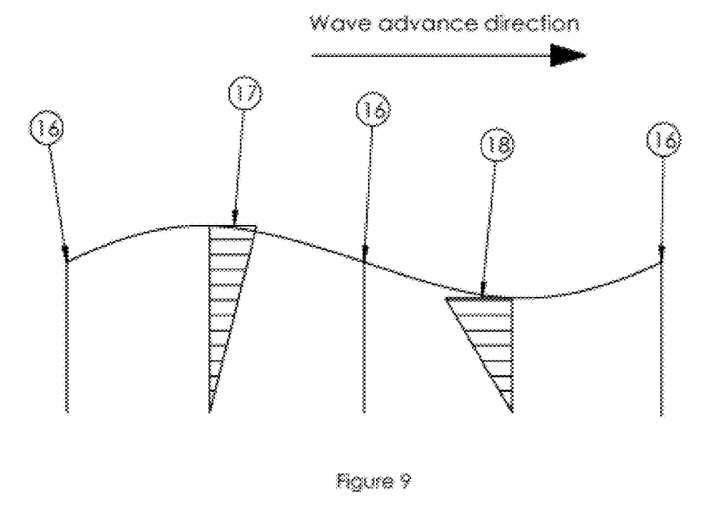
FIG. 9 illustrates water speed distribution inside a wave.

FIG. 9 illustrates water horizontal flow speed of a wave in shallow water. In the still water level 16 there is no horizontal movement. In crest 17 the water flows towards the shore, in through 18 it flows back to open waters. The flow speed has its maximum at the surface and reduces linearly with increasing depth.

Figure 10:
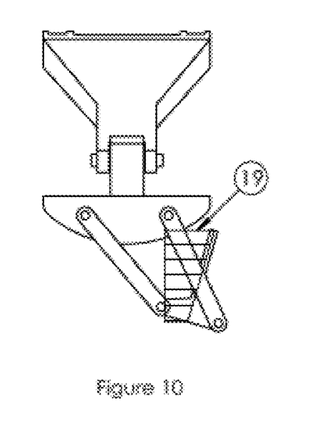
FIG. 10 illustrates required flap speed distribution to match the water speed distribution.

FIG. 10 illustrates the optimum flap movement speed 19, having equal speed difference to the flow speed in all depths. This flap speed distribution generates uniform stagnation pressure on the entire flap surface, without internal loads caused by unequal pressure.

Figure 11:
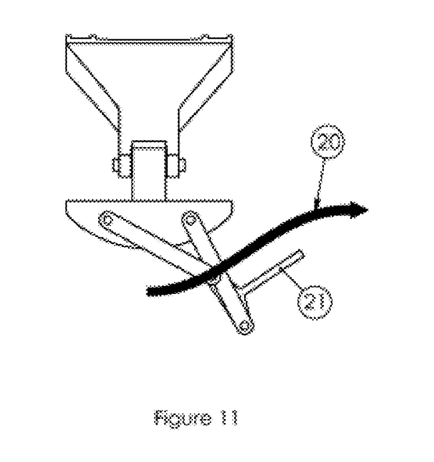
FIG. 11 illustrates a flap arrangement preventing overloading by turning parallel to the water movement at extreme position.

FIG. 11 illustrates flap 21 turning parallel to flow under extreme wave conditions. Water flow 20 can go below and above the flap, not causing excessive loads to the structures.

Figure 12:
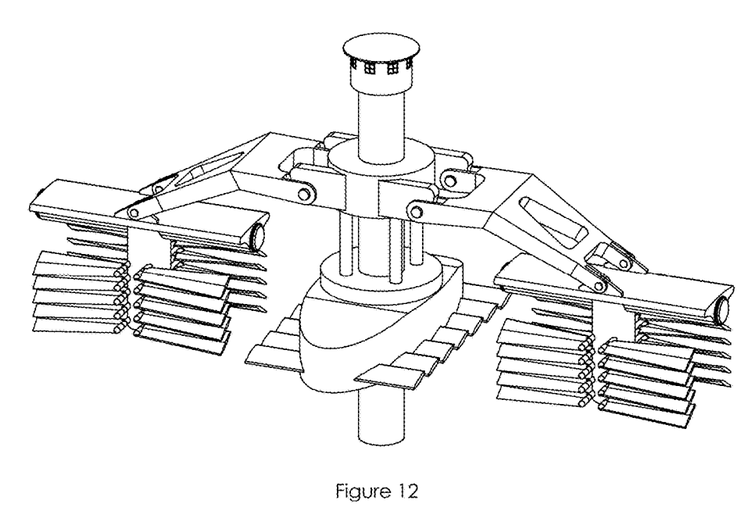
FIG. 12 illustrates an exemplary power plant with horizontally oriented wings.

FIG. 12 illustrates an exemplary power plant with horizontally oriented wings.

Figure 13:
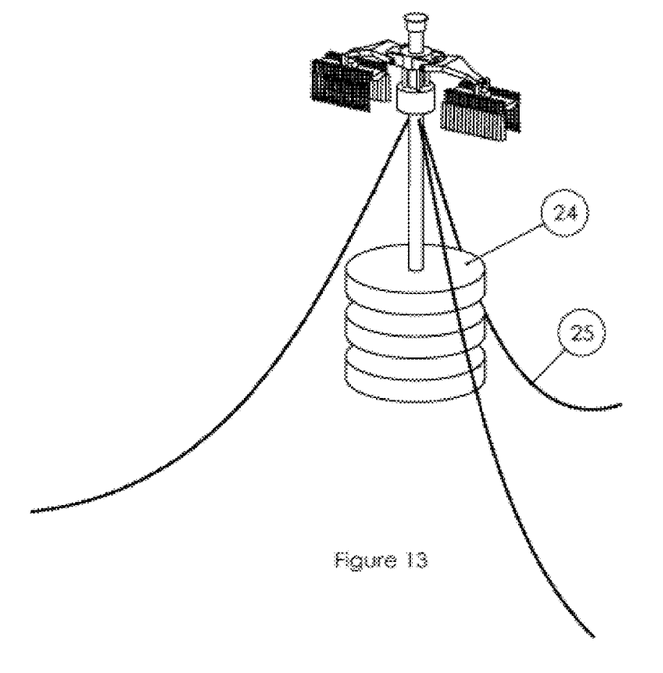
FIG. 13 illustrates floating foundation with structures utilizing added mass for counter action.

FIG. 13 illustrates floating foundation having submerged volumes 24 on depth having reduced water movements. The volumes are shaped to capture added water mass from surrounding water to increase counter weight action. This support structure can also be used when a wind power plant is integrated with the wave power plant.

The structure of FIG. 13 solves an important problem with floating foundations of wave power plants, wind power plants and their combinations. Such foundations tend to turn due to decline due to forces caused by waves, sea streams, reaction forces of the wave power plant or a wind turbine installed on the foundation. These forces can be compensated by one or several submerged water tanks 24 by dividing them in separated parts and pumping air and/or water between the parts thus controlling the distribution of the mass between the parts. This causes a momentum in the floating foundation and can be used for compensating the decline of the structure caused by external forces.

Figure 14:
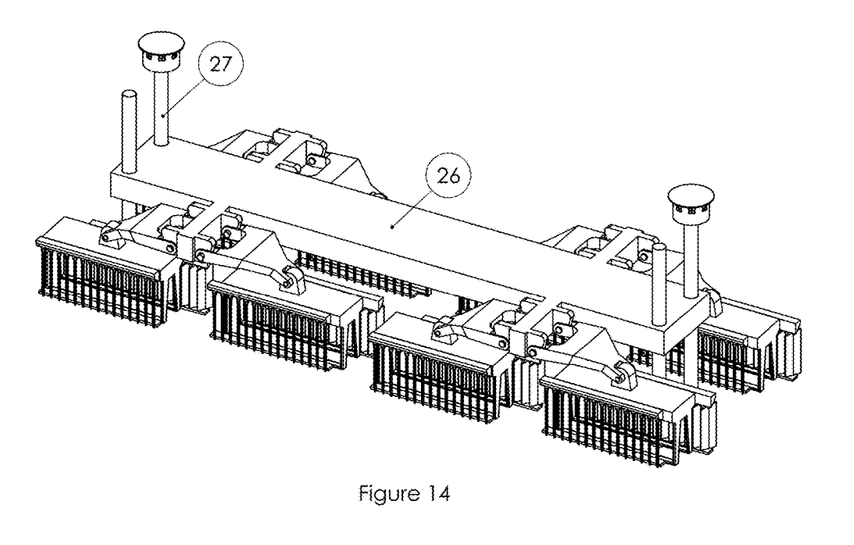
FIG. 14 illustrates an alternative plant with a jack-up body part standing on legs.

FIG. 14 illustrates an alternative plant with a jack-up body part 26 standing on legs 27. This structure does not turn with the direction of a wave crest, but the structure may be advantageous in installations where the water movement has a relatively constant direction.

A wave power installation may include one or several wave power plants combined from presented concepts. If the installation includes two or more wave power plants they may be installed in parallel positions at a suitable distance from each other. It may be preferable to have a slight difference in their distance from the shore line in order to efficiently utilize waves with different directions. When the floats can turn in relation to the columns they will set into the optimized position in each power plant. If a power plant with legs (FIG. 14) is used it is possible to use the same legs in the middle of the installation for supporting floats in both sides of a leg. In this case the installation has legs at the ends of the installation and intermediate legs between the end legs.

FIG. 15 illustrates an exemplary pressure accumulator system, which can be used in implementing the invention. Wave energy converters create transient cyclic hydraulic oil flow according to momentary power available in wave. These transients create power ripple and difficulties in power grid. Some sort of power regulation is always needed.

Current state of art hydraulic pressure accumulators require huge gas volumes to retain usefully stabile pressure. Pressure is never constant but changes due to gas volume change caused by accumulator charging and discharging. Getting pressure usefully close to constant require gas volume being an order of magnitude larger than liquid volume, thus being very impractical. Trying to use such accumulators as energy reservoirs is almost impossible.

This problem can be solved with twin-phase pressure accumulator system where propellant changes phase between gas and liquid, depending on the required volume. Pressure remains constant and required propellant volume in liquid form is only a small fraction of gaseous propellant, making entire system much smaller and practical.

Twin-phase hydraulic energy reservoir system consists of a high pressure accumulator 51 using twin-phase propellant fluid existing both in gas 52 and liquid 53 phase, depending on filling stage of the accumulator. Propellant fluid keeps hydraulic oil pressure 54 constant, by expanding due to vaporization or condensing to liquid, according to volume change. One such useful propellant is carbon dioxide ($CO_2$).

Low pressure accumulator 55 has also twin-phase propellant which exists both in gas phase 56 and liquid phase 57, depending on the accumulator filling stage 58. Low pressure accumulator propellant has lower boiling pressure, adequate to avoid hydraulic cavitation in low pressure lines 59. One such propellant family are freons and other refrigerants.

Pressure accumulators can be of a bladder type 64 or a piston type 65. A piston type accumulator with unequal piston diameters 66 can act as pressure enhancer, allowing operation with pressures higher than propellant boiling pressure.

While operating, the pumping cylinders 60, hydraulic pumps 61 and other pressurization components suck low pressure hydraulic fluid 58 from low pressure accumulator, and pressurize the fluid to high pressure, feeding it to high pressure accumulator. Energy production machinery, for example hydraulic motors 62 or turbines 63, receive constant pressure feed.

The kinetic energy of waves can be captured with wings or flaps, the wings being a preferable alternative to implement the invention. To understand the difference between "a wing" and "a flap" it is essential to define their function. This is next explained referring to FIGS. 16 and 17.

Figure 16:
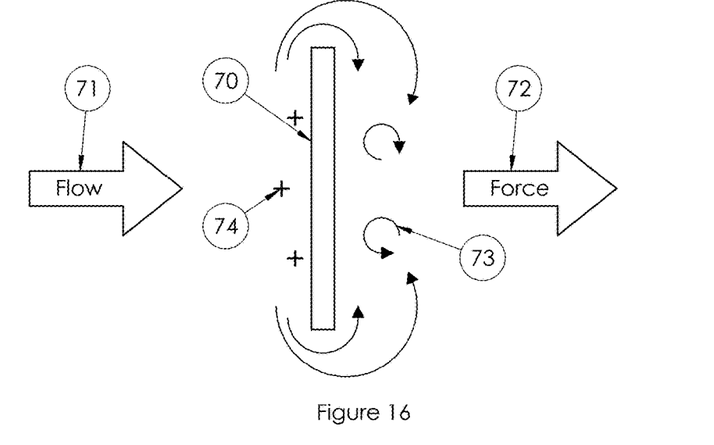
FIG. 16 illustrates operating principle of a flap.

A flap 70 is a surface, usually flat or close to it, transversal to flow 71. Good example is a paddle wheel of a historical boat. Propulsion force 72 is generated by impulse of when a flap travels through water, or flow attacks a flap. A small suction is also generated behind the flap, with remarkable turbulence 73 creating lots of energy loss. Propulsion force is parallel to the flow/movement direction. In flow, fluid particles lose their kinetic energy when hitting the surface, causing pressure increase called stagnation pressure 74.

Figure 17:
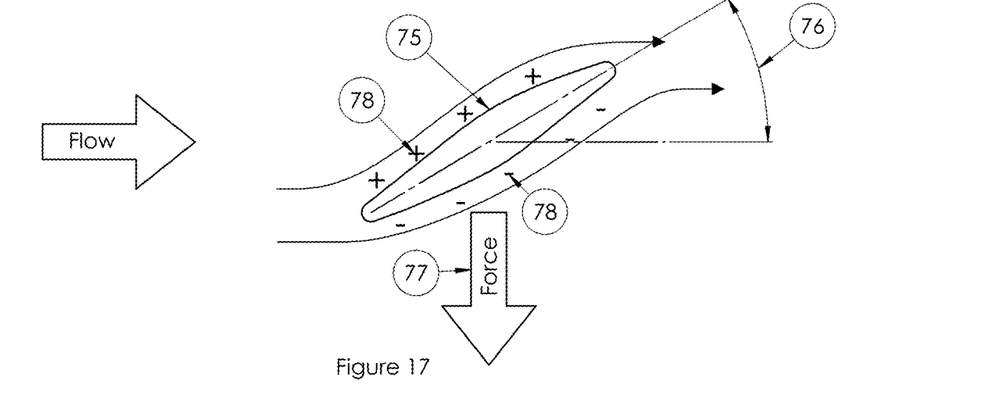
FIG. 17 illustrates operating principle of a wing.

A wing is a streamlined profile 75, having an angle of attack 76 between profile center axis and flow. Good example is a propeller blade. Propulsion force 77 is generated by reaction to pressure differences 78 on each side of the profile. Propulsion force is transversal to the flow/movement direction. In flow, fluid particles continue movement along the profile and pressure differences are generated by local increase/decrease of flow speed.

A flap can't be easily adapted to changing flow conditions. The only method is to reduce its area projected to flow by turning it around an axes. On contrary, a wing profile angle of attack adjustment has radical effect on the propulsion force called lift. With turning a wing profile along flow, the entire propulsion force can be eliminated. Due to streamlined shape, only a small drag force remains.

It must be noted that above only some embodiments of the solution according to the invention have been described. The principle of the invention can naturally be modified within the scope of protection determined by the patent claims, e.g. in details of implementation and areas of use.

It should further be noted that the energy plant according to the invention preferably utilizes water movements caused waves, but it may alternatively or additionally utilize water movements caused by tide, river stream etc.

The invention claimed is:

1. A hybrid energy plant for capturing energy from waves, comprising:
   a support structure, the support structure including joints;
   one or more wave floats connected to the support structure and movable with respect to the support structure via the joints,
   wherein at least one of the wave floats is arranged to capture wave potential energy;
   two or more arrays of elements attached to the at least one of the wave floats and arranged to capture wave kinetic energy, each array of the elements being an array of wings and/or an array of flaps,
   wherein the two or more arrays of elements are movable, via joint elements, independently of each other;
   wherein the at least one of the wave floats captures energy from the wave potential energy simultaneously with the wings and/or the flaps in the array of elements capturing energy from the wave kinetic energy; and
   a connection that connects the at least one of the wave floats and the array of elements to the support structure, wherein the connection allows changing a vertical position and/or an orientation of
   i) the at least one of the wave floats and/or
   ii) the wings and/or flaps of the array of elements to accommodate to changes in water surface height and wave direction,
   wherein an angle of attack of the wings and/or a movement of the flaps adjust to match a water speed profile in different water depths, and
   wherein the wings are arranged to have alternating angle of attack and profile according to the water flow speed, and the movement of the flaps is arranged to follow water particle speed distribution and path length in the different water depths, thereby eliminating internal forces to the flaps caused by mismatch.

2. The plant according to claim 1, further comprising one or more tidal compensation floats that keep the at least one of the wave floats and the wings and/or flaps on a preferred position related to the water surface.

3. The plant according to claim 1, further comprising a tidal compensation float shaped to create counter forces or movements.

4. The plant according to claim 1,
   wherein the one or more wave floats connected to the support structure comprise two wave floats located on opposite sides of the support structure and aligned in a first direction, and
   further comprising a tidal compensation float equipped with protruding heave compensators arranged along opposite side and a tank, the tank located between the two wave floats and aligned to intersect a line defined by the first direction.

5. The plant according to claim 1, further comprising a tidal compensation float shaped to force more flow to the wings or flaps.

6. The plant according to claim 1, further comprising a tidal compensation float with adjustable tanks with an arrangement for pumping water and air between the tanks.

7. The plant according to claim 1, further comprising a tidal compensation float equipped balanced floats on two or more sides to turn the plant orientation parallel to the wave crests.

8. The plant according to claim 1, further comprising a tidal compensation float, and the one or more wave floats are connected to the tidal compensation float with bar mechanism, hinge, slides or rollers.

9. The plant according to claim 1, the one or more wave floats are connected to the support structure with a bar mechanism, a hinge, slides or rollers.

10. The plant according to claim 1, wherein the wings and/or flaps are connected to the at least one of the wave floats or to the support structure with a bar mechanism, a hinge, slides or rollers.

11. The plant according to claim 1, further comprising a tidal compensation float, and the wings and/or flaps have a connection to the tidal compensation float comprised of a bar mechanism, a hinge, slides or rollers.

12. The plant according to claim 1, wherein the at least one of the wave floats is dimensioned to let waves exceeding plant capacity to flow over the at least one of the wave floats.

13. The plant according to claim 1, further comprising a tidal compensation float having buoyancy volume to lift parts of the plant to avoid excessive loads in high waves.

14. The plant according to claim 1, wherein the wings are arranged to have adjustable angle of attack according to wave conditions.

15. The plant according to claim 1, wherein the angle of attack of the wings and the movement of the flaps adjust to match the water speed profile in the different water depths.

16. The plant according to claim 1, wherein the flaps have a support mechanism arranged to turn the flaps more parallel to water flow in case of excess loads.

17. The plant according to claim 1, wherein the wings have angle of attack adjustment mechanism turning the wings more parallel to flow in case of excess loads.

18. The plant according to claim 1, wherein the support structure comprises a pile/column or other structure attached to the sea bottom or a heavy gravitational item, either existing one for other purposes, or a dedicated one for the plant, or a combination of both.

19. The plant according to claim 1, wherein the support structure comprises anchoring.

20. The plant according to claim 1, wherein the support structure has a floating, anchored foundation.

21. The plant according to claim 20, wherein the floating, anchored foundation comprises a plurality of vertically aligned water tanks, water in the water tanks being pumpable between the water tanks in order to compensate for a decline of the support structure due to external forces.

22. The plant according to claim 1, further comprising a power take off system with a mechanism moving cylinders, rotators or pumps, wherein the mechanism has adjustable ratio of movement.

23. The plant according to claim 22, wherein the power take off system includes twin-phase accumulators with pressurizing fluid that is partly gas and partly liquid, the partly liquid pressurizing fluid boiling to gas when a pressurizing volume expands, thus keeping the pressure constant independent of hydraulic fluid level.

24. The plant according to claim 22, wherein the power take off system has low functional pressure accumulators with different twin phase pressurizing fluid.

25. The plant according to claim 24, wherein the power take off system is arranged to have hydraulics with an intermediate fluid between hydraulic fluid and two phase pressurizing fluids.

26. The plant according to claim 1,
wherein the one or more wave floats connected to the support structure comprise two wave floats located on opposite sides of the support structure and aligned in a first direction, and
further comprising a tidal compensation float equipped with protruding heave compensators arranged along opposite side and a submerged heave stabilizer tank, the heave stabilizer tank located between the two wave floats and aligned to intersect a line defined by the first direction.

27. A hybrid energy plant for capturing energy from waves, comprising:
a support structure having an upper end and a lower end;
a tidal compensation float that slides and rotates around the support structure, the tidal compensation float comprising a submerged part, a connecting part, and an upper part, the upper part of the tidal compensation float arranged to slide towards the upper end and towards the lower end of the support structure and to rotate around the support structure;
a first arm having a first end pivotally connected to the upper part of the tidal compensation float at a first location;
a second arm having a first end pivotally connected to the upper part of the tidal compensation float at a second location opposite the first location;
a first wave float pivotally connected to a second end of the first arm;
a second wave float pivotally connected to a second end of the second arm,
wherein the first and second wave floats are arranged to capture wave potential energy,
wherein the first and second wave floats are movable independent of each other by i) the first and second wave floats pivoting at the second end of a corresponding one of the first and second arms, and ii) by the first end of the corresponding one of the first and second arms pivoting at the upper part of the tidal compensation float;
a first wing array arranged on a first side of the first wave float and a second wing array arranged on an opposite, second side of the first wave float; and
a third wing array arranged on a first side of the second wave float and a fourth wing array arranged on an opposite, second side of the second wave float,
wherein the first, second, third, and fourth wing arrays are each arranged to capture wave kinetic energy,
wherein the first wave float and the first and second wing arrays respectively simultaneously capture energy from the wave potential energy and the wave kinetic energy,
wherein the first wave float and the first and second wing arrays simultaneously respectively capture energy from the wave potential energy and the wave kinetic energy,
wherein the i) the upper part of the tidal compensation float being arranged to slide towards the upper end and towards the lower end of the support structure and to rotate around the support structure, and ii) the first and second wave floats being movable independent of each other by the first and second wave floats pivoting at the second end of a corresponding one of the first and second arms, and by the corresponding one of the first and second arms pivoting at the upper part of the tidal compensation float allows changing a vertical position and/or an orientation of i) the first and second wave floats and/or ii) the the first, second, third, and fourth wing arrays to accommodate changes in water surface height and wave direction,
wherein each of the first, second, third, and fourth wing arrays move independently of each other, and
wherein the first, second, third, and fourth wing arrays are each comprised of a plurality of wings that have an adjustable angle of attack that adapts to varying water flow speeds in different wave conditions, and each of the wings being turnable about a support and with respect to the corresponding first or second wave float.

28. A hybrid energy plant for capturing energy from waves, comprising:
a support structure;
plural wave floats,
wherein each of the wave floats is arranged to capture wave potential energy; and
at least one of an array of wings and an array of flaps attached to each of the wave floats, wings of the array of wings and flaps of the array of flaps are arranged to capture simultaneously wave kinetic energy,
a connecting structure that connects each of the wave floats and the at least one of the array of wings and the array of flaps are connected to the support structure, the connecting structure allowing vertical positioning and/or orientation of a first of the wave floats and the at least one of the array of wings and the array of flaps attached to the first of the wave floats to accommodate changes in water surface height and wave direction independently of the water surface height at a second of the wave floats and the at least one of the array of wings and the array of flaps attached to the second of the wave floats.

* * * * *